May 6, 1947.  F. D. FRISBY ET AL  2,420,040
SHAFT OIL SEAL
Filed July 13, 1945
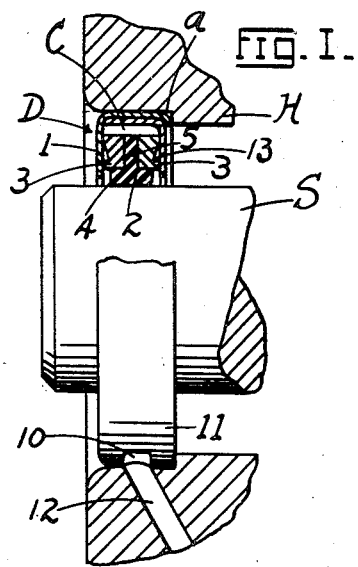
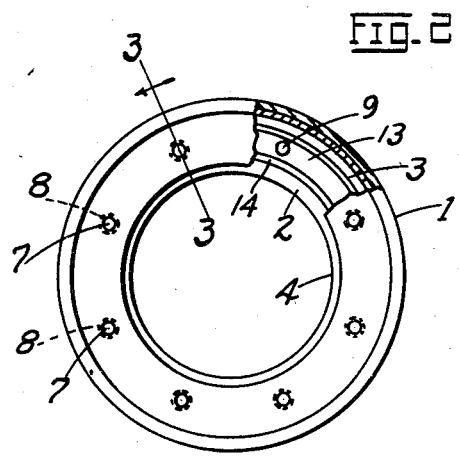
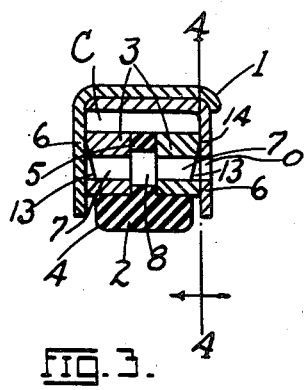
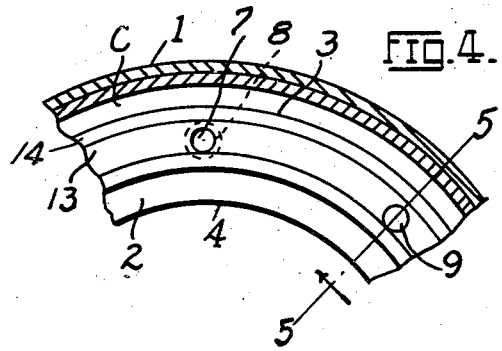
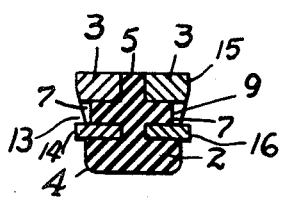
INVENTOR.
Frank D. Frisby and
Melvin W. Marien
BY Harry A. Benner
ATTY.

Patented May 6, 1947

2,420,040

UNITED STATES PATENT OFFICE 2,420,040

SHAFT OIL SEAL

Frank D. Frisby and Melvin W. Marien, St. Louis, Mo., assignors to Ramsey Accessories Manufacturing Corporation, St. Louis, Mo., a corporation of Missouri Application July 13, 1945, Serial No. 604,917

4 Claims. (Cl. 286—5)

Our invention has relation to improvements in shaft oil seals and it consists in the novel features of construction more fully set forth in the specification and pointed out in the claims.

The sealing device comprises a ring assembly for application to shafts of turbines and other high speed rotary devices operating between 4,000 and 15,000 R. P. M.'s, and has for its principal object the sealing of the shaft housing to prevent the escape of oil. A further object is to provide a sealing device that will insure a circulation of the oil through the seal by a pumping action that will draw the atomized oil from the housing and force it back to the crank-case or oil well as the case might be. These objects as well as others inherent in the invention will be better apparent from a detailed description of the invention, in connection with the accompanying drawings, in which—

Figure 1 is a middle vertical section of a housing showing our improved sealing device applied thereto; Figure 2 is a side elevation of the sealing device with parts broken away; Figure 3 is a cross-sectional detail on an enlarged scale taken on the line 3—3 of Figure 2; Figure 4 is a vertical longitudinal section taken on a plane indicated by the line 4—4 on Figure 3; and Figure 5 is a cross-sectional detail taken on the line 5—5 of Figure 4 and showing only the ring (the cage being omitted).

Referring to the drawings, S represents a shaft passing through a housing H having an annular recess $a$ for receiving the sealing device assembly D.

The sealing device D comprises a cage 1 pressed into recess $a$, said cage containing a central rubber ring component 2 and marginal metallic ring components 3, 3 in intimate engagement with component 2. The central component 2 is preferably T-shaped having a base 4 and flange 5, the former embracing shaft S. The metallic ring components 3, 3 are designed to place the component 2 under slight compression so that it will firmly grip shaft S and adhere thereto while it is in motion.

The components 3, 3 fit snugly between flange 5 and side walls 6, 6 of cage 1 so that said flange 5 will also be under slight compression. The pressure thus imposed on the component 2 by components 3, 3 will insure that all these components will rotate with the shaft S as a unit and within cage 1. It will be observed (Figs. 2 to 5 inc.) that there are a plurality of equally spaced holes 7 in both components 3 which are in register, and all but one of which also register with holes 8 in component 2, said holes 8 being slightly larger than holes 7 because of the compressibility of component 2. At one point in its circumference the component 2 is provided with oppositely disposed bosses 9, 9 instead of a hole 8. These bosses 9, 9 project into alining holes 7, 7 in components 3, 3 and serve to lock said components to the component 2.

We provide an oil drainage slot 10 in the circumferential wall 11 of cage 1; and a drainage port 12 in housing H leading to the slot 10 through which excess oil will flow from the annular space C between the sealing ring components 2 and 3 and cage 1.

In the operation of our invention the rapidly rotating shaft S throws oil outwardly under centrifugal action, some of which becomes atomized so that the housing H becomes filled with finely divided oil particles. Since the ring components 2 and 3 rotate within cage 1 at the same speed at which shaft S rotates a suction is created within cage 1 and this atomized oil is sucked through holes 7 and 8 to maintain a thorough lubrication between the ring components 3, 3 and cage walls 6, 6. In order to obtain a high unit pressure between the ring components 3 and cage walls 6 whereby the oil flow may be held to a minimum, I provide channels 13, 13 on the outer faces 14, 14 of components 3, 3. This reduces the contact surfaces between components 3, 3 and walls 6, 6 to the narrow surfaces 15, 15 and 16, 16 and greatly increases the sealing effect of components 2 and 3 and at the same time insures adequate lubrication between these components and cage 1.

During the operation of the apparatus equipped with our sealing device, the passage of oil through the passages 13, 13 will be impelled by the centrifugal force caused by the high rotation speed to flow past the surfaces 15, 15 into the annular space C of the cage 1.

Any excess of oil that finds its way into cage 1 will be vented through slot 10 and drainage port 12.

Having described our invention, we claim:

1. A shaft oil sealing device comprising a cage and a ring assembly mounted on said shaft and rotatable within said cage, said ring assembly comprising a resilient component embracing the shaft and rigid components on each side of the resilient component having sliding contact with the cage, and registering oil passageways in all three of said components.

2. A shaft oil sealing device comprising a cage and a ring assembly mounted on said shaft and rotatable within said cage, said ring assembly comprising a resilient component embracing the shaft and rigid components on each side of the resilient component having sliding contact with the cage, and registering oil passageways in all three of said components and means for venting surplus oil from said cage.

3. A shaft oil sealing device comprising a cage and a ring assembly mounted on said shaft and rotatable within said cage, said ring assembly comprising a resilient component embracing the shaft and rigid components on each side of the resilient component having sliding contact with the cage, and registering oil passageways in all three of said components, and said rigid components having circumferential channels in their outer faces whereby the unit pressure between said components and the cage is increased.

4. A shaft oil sealing device comprising a cage and a ring assembly mounted on said shaft and rotatable within said cage, said ring assembly comprising a resilient component embracing the shaft and rigid components on each side of the resilient component having sliding contact with the cage, and registering oil passageways in all three of said components, and means for locking said components together.

FRANK D. FRISBY.
MELVIN W. MARIEN.

REFERENCES CITED

The following references are of record in the file of this patent:

UNITED STATES PATENTS

| Number    | Name   | Date          |
|-----------|--------|---------------|
| 2,393,779 | Hunter | Jan. 29, 1946 |

FOREIGN PATENTS

| Number  | Country | Date |
|---------|---------|------|
| 388,052 | British | 1933 |
| 699,736 | German  | 1940 |
| 321,274 | British | 1929 |
| 318,775 | British | 1929 |